United States Patent
Gentili et al.

(10) Patent No.: US 10,701,656 B2
(45) Date of Patent: Jun. 30, 2020

(54) CLOCK SKEW COMPENSATION METHOD AND RELATED SYSTEM

(71) Applicant: STMicroelectronics S.r.l., Agrate Brianza (IT)

(72) Inventors: Maurizio Gentili, Santa Clara, CA (US); Roberto Sannino, Romano di Lombardia (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 145 days.

(21) Appl. No.: 15/658,203

(22) Filed: Jul. 24, 2017

(65) Prior Publication Data

US 2018/0184389 A1 Jun. 28, 2018

(30) Foreign Application Priority Data

Dec. 22, 2016 (IT) .................. 102016000130103

(51) Int. Cl.
*H04W 56/00* (2009.01)

(52) U.S. Cl.
CPC ..... *H04W 56/005* (2013.01); *H04W 56/0015* (2013.01); *H04W 56/0035* (2013.01)

(58) Field of Classification Search
CPC ........... H04W 56/0005; H04W 56/001; H04W 56/0015; H04W 56/0035; H04W 56/004; H04W 56/0045; H04W 56/005; H04W 56/0055; H04W 56/0065
See application file for complete search history.

(56) References Cited

U.S. PATENT DOCUMENTS

| | | | | |
|---|---|---|---|---|
| 6,072,532 A * | 6/2000 | Chieh | ................... | H04N 7/035 348/467 |
| 8,358,633 B1 * | 1/2013 | Talley | ................... | H04W 28/22 370/252 |
| 2002/0136181 A1 * | 9/2002 | Belaiche | ............... | H04L 1/0025 370/337 |
| 2004/0066801 A1 * | 4/2004 | Fujishiro | ............... | H04J 3/0644 370/521 |

(Continued)

FOREIGN PATENT DOCUMENTS

| CN | 101378512 A | 3/2009 |
|---|---|---|
| CN | 104079358 A | 10/2014 |

(Continued)

OTHER PUBLICATIONS

Extended European Search Report, dated Apr. 20, 2018, for European Application No. 17203381.3-1219, 6 pages.

(Continued)

*Primary Examiner* — Hoang-Chuong Q Vu
(74) *Attorney, Agent, or Firm* — Seed IP Law Group LLP

(57) ABSTRACT

A device includes a transceiver, which, in operation, exchanges data packets over a wireless communication link with a remote device during connection events separated by a determined connection interval. The device includes data processing circuitry, which, in operation, measures an indication of a duration of time between at least two consecutive connection events associated with the remote device and adjusts a bit rate based on the measured indication of the duration of time and the determined connection interval.

27 Claims, 6 Drawing Sheets

(56) References Cited

U.S. PATENT DOCUMENTS

| | | | |
|---|---|---|---|
| 2007/0076693 A1* | 4/2007 | Krishnaswamy | H04L 47/10 370/352 |
| 2007/0263720 A1* | 11/2007 | He | H04N 19/124 375/240.03 |
| 2007/0297459 A1 | 12/2007 | Cucos et al. | |
| 2008/0037674 A1* | 2/2008 | Zurek | H04L 29/06027 375/262 |
| 2010/0254368 A1* | 10/2010 | Yamaura | H04L 63/0869 370/345 |
| 2012/0195388 A1* | 8/2012 | Oike | H04N 21/2402 375/259 |
| 2013/0045684 A1 | 2/2013 | Linde et al. | |
| 2014/0122742 A1 | 5/2014 | Rojas-Cessa et al. | |
| 2014/0173055 A1* | 6/2014 | Yu | H04L 65/607 709/219 |
| 2014/0211675 A1* | 7/2014 | Skog | H04W 72/1242 370/311 |
| 2014/0348327 A1 | 11/2014 | Linde et al. | |
| 2015/0281288 A1* | 10/2015 | Levinson | H04L 47/41 709/219 |
| 2015/0312858 A1 | 10/2015 | Kerai | |
| 2015/0334488 A1 | 11/2015 | Kim et al. | |
| 2015/0350046 A1* | 12/2015 | Thapliya | H04L 43/0894 709/224 |
| 2016/0043959 A1* | 2/2016 | Thapliya | H04L 43/0829 370/230 |
| 2016/0342201 A1* | 11/2016 | Jehan | A61B 5/024 |
| 2017/0026446 A1* | 1/2017 | Svevar | H04J 3/0632 |
| 2017/0142610 A1* | 5/2017 | Nihei | H04L 29/08 |

FOREIGN PATENT DOCUMENTS

| | | |
|---|---|---|
| CN | 104798436 A | 7/2015 |
| CN | 105101010 A | 11/2015 |

OTHER PUBLICATIONS

Gentili et al., "BlueVoice: Voice communications over Bluetooth Low Energy in the Internet of Things Scenario," *Computer Communications* 89-90:51-59, 2016.

Italian Search Report, dated Sep. 12, 2017, for Italian Application No. IT201600130103, 7 pages.

\* cited by examiner

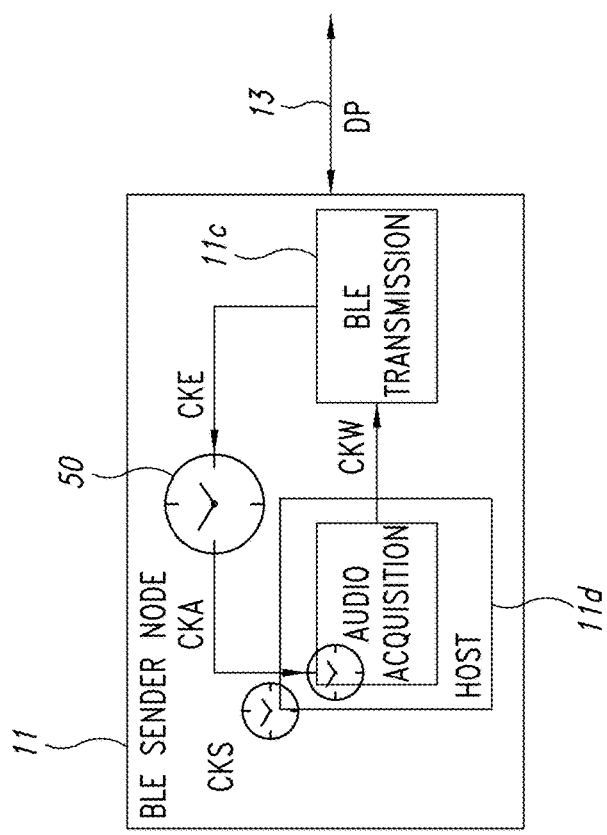
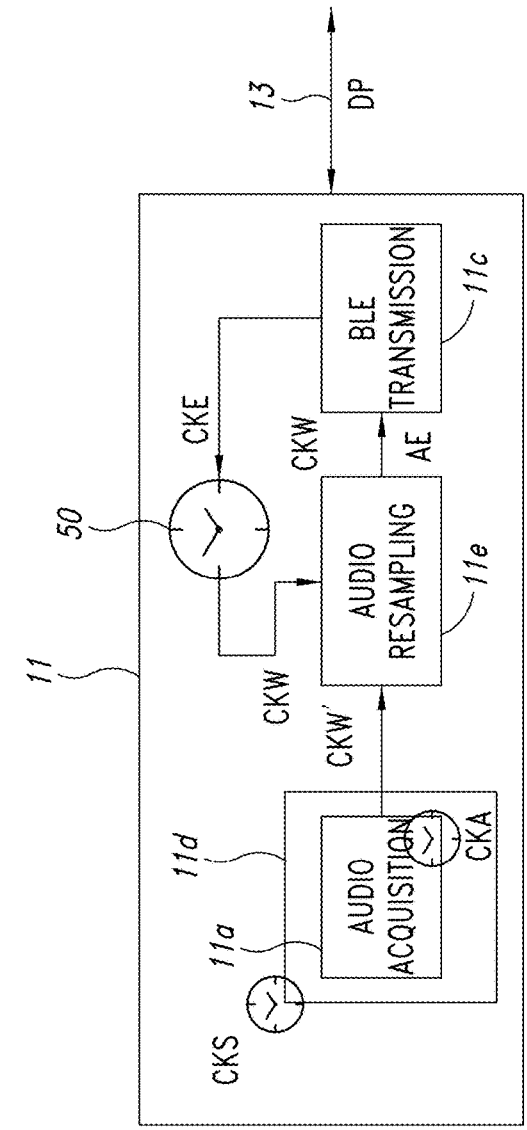

CLOCK SKEW COMPENSATION METHOD AND RELATED SYSTEM

BACKGROUND

Technical Field

The present disclosure relates to clock skew compensation during an audio data streaming.

Description of the Related Art

In a distributed audio application sender and receiver hardware may not be synchronized and may therefore have different clocks: non-synchronized clocks will differ after some amount of time as the clocks count at slightly different rates. The difference in frequencies of two free-running clocks is typically known as clock skew. This difference in frequencies accumulates over time and causes inconsistencies: considering a system composed of only two nodes, a sender node and a receiver node, the sender node will produce either more or less data than the receiver is expected to consume, depending on which of the two clocks is faster. In the considered scenario, data are sent by the sender node at a write frequency $f_{write}$, stored in a temporary buffer in the receiver node, and then consumed at a read frequency $f_{read}$.

Two different situations can occur:

if the read frequency $f_{read}$ is smaller than the write frequency $f_{write}$, the buffer of the receiver node reaches its upper limit, causing a buffer overrun;

if the read frequency $f_{read}$ is greater than the write frequency $f_{write}$, the buffer of the receiver node reaches its lower limit, causing a buffer underrun.

In both cases, the audio signal may not be correctly reproduced and audible artifacts may be introduced in the audio streaming.

The basic approach to compensate this effect is for the receiver to insert or remove frames to avoid a buffer underrun or overflow condition: single frames are simply dropped or repeated in order to keep the buffer at the desired value. Other solutions are based on more complex approaches, trying to duplicate or drop packets without causing strong discontinuities. A similar approach is to simply monitor the buffer queue length and change the playback speed so as to keep the queue close to a defined value. If the queue is too short, the playback slows down to remove less samples from the receiver buffer. If the queue is too long, the playback must accelerate to take more samples from the buffer.

More complex solutions also exist in literature to address clock skew: one idea is to try to estimate the clock difference between the sender and receiver clock and, consequently, to correct the streaming so as to compensate for the clock difference. In order to estimate the clock deviation, some solutions rely on time stamped network packets: each audio packet is marked with a sender timestamp containing the sender local time, while the receiver gets its timestamp at each packet arrival. The difference between these two measures is used to compute the clock skew, hence the difference in sample rate between the sender and the receiver. The estimated clock skew is then used as the conversion rate for a sample rate converter that takes its input from the stream buffer and sends its output to the audio hardware. The sample rate converter would prevent buffer overflows and underflows and the number of frames the sample rate converter reads from the buffer would be equal to the number of frames that were received over the network. As long as the sample rate variations were low enough, the change in pitch produced by the sample rate conversion would not be audible, and with a sample rate converter that is using a good enough algorithm, no audible aliasing would be present.

BRIEF SUMMARY

In an embodiment, a method of performing a clock skew compensation during an audio data streaming between a sender device and at least one remote receiver device, said audio data streaming being performed according to a Bluetooth Low Energy (BLE) communications protocol, said audio data streaming comprising exchanging said data packets between the sender device and the at least one remote receiver device operating with a remote clock, said data packets being exchanged over said wireless link in packet groups during connection events separated by a determined connection interval, said sender device and at least one remote receiver device being clocked by a respective system clock, said method including acquiring at said sender device audio data from an audio data source at an acquisition frequency, supplying said acquired data at a first supply frequency or bit-rate to a transceiver module in said sender device and transmitting said acquired data in data packets over a wireless link, the method including receiving said acquired data in data packets at said one remote receiver device, supplying said received audio data to a playback device at a second supply frequency.

In an embodiment, the method includes obtaining at the sender device and/or receiver device a respective clock correction measuring with the respective system clock said connection interval as the difference in time at least between two consecutive connection events, correcting said first and/or second supply frequency or bit-rate on the basis of said respective clock correction.

In an embodiment, the method includes supplying said acquired data at a first supply frequency or bit-rate to a transceiver module in said sender device and transmitting said acquired data in data packets over a wireless link includes encoding said audio data, transferring the obtained encoded data to the transceiver module in said sender device and receiving said encoded data in data packets at said one remote receiver device includes decoding the thus received encoded data into received audio data, supplying said received audio data to a playback device at a second supply frequency.

In an embodiment, the method includes correcting said first and/or second supply frequency on the basis of said respective correction clock signal includes setting said acquisition frequency and, respectively, said playback frequency equal to said correction clock signal, wherein the respective system frequency is independent of the supply frequency.

In an embodiment, the method includes that said correcting said first and/or second supply frequency on the basis of said respective correction clock signal includes setting said acquisition frequency and, respectively, said playback frequency as equal to the frequency of said correction clock signal.

In an embodiment, the method includes that said correcting said first and/or second supply frequency or bitrate on the basis of said respective correction clock signal includes setting said acquisition frequency and, respectively, said playback frequency as equal to the frequency of said correction clock signal.

In an embodiment, the method includes that said measuring with the respective system clock said connection interval as the difference in time at least between two consecutive connection events includes measuring with the acquisition frequency.

In an embodiment, the method includes that said measuring with the respective system clock said connection interval as the difference in time at least between two consecutive connection events includes measuring a re-sampled supply frequency.

In an embodiment, the method includes that there are a plurality of remote devices.

In an embodiment, the method includes that it is provided, given the audio packets received at the local device within a same connection interval from different remote devices, measuring the phase delay of the packet of each remote device with respect to the other, communicating from the local device on a dedicated channel to all the remote devices their respective phase delay, performing alignment of the phase at each remote node on the basis of the respective communicated phase delay.

In an embodiment, the method includes supplying said respective clock correction obtained measuring with the respective system clock said connection interval as feedback signal in a control loop, to be compared with a reference value of the connection interval to obtain an connection interval error to be corrected by the control loop.

In an embodiment, said audio data streaming is performed according to a Bluetooth Low Energy communications protocol.

The present disclosure relates also to a system for performing an audio data streaming between a local sender device and at least a remote receiver device, said sender device being connected to an audio data source and said receiver device being connected to a playback device, performing the clock skew compensation method according to one or more of the methods disclosed herein.

In an embodiment, the system includes that said sender and/or receiver includes a control module configured to obtain said respective clock correction measuring with the respective system clock and to use said connection interval as feedback signal in a control loop, and to compare said clock correction with a reference value of the connection interval to obtain an connection interval error to be corrected by the control loop.

In an embodiment, a method comprises: acquiring, by a transmitting device, audio data from an audio data source at an acquisition frequency; generating, by the transmitting device and at a first bit rate, an audio data signal from the acquired audio data; transmitting, over a wireless communication link and by the transmitting device, data packets including the audio data signal in packet groups during connection events separated by a determined connection interval; receiving, via the wireless communication link and by a receiving device, the transmitted packet groups; generating, by the receiving device and at a second bit rate, an audio playback signal based on the received packet groups; measuring, by at least one of the transmitting device and the receiving device, an indication of a duration of time between at least two consecutive connection events; and adjusting at least one of a transmission bit rate and the second bit rate based on the measured indication of the duration of time. In an embodiment, the transmitting comprises audio data streaming according to a Bluetooth Low Energy (BLE) communications protocol. In an embodiment, the transmitting device is clocked by a first clock and the receiving device is clocked by a second clock. In an embodiment, the adjusting at least one of the transmission bit rate and the second bit rate comprises adjusting a clock rate of at least one of the first clock and the second clock. In an embodiment, the transmitting device includes an acquisition clock and the adjusting at least one of the transmission bit rate and the second bit rate comprises adjusting a clock rate of the acquisition clock. In an embodiment, the measuring the indication of the duration of time is performed by the transmitting device using the acquisition clock. In an embodiment, the receiving device includes a playback clock and the adjusting at least one of the transmission bit rate and the second bit rate comprises adjusting a clock rate of the playback clock. In an embodiment, the measuring the indication of the duration of time is performed by the receiving device using the playback clock. In an embodiment, the adjusting at least one of the transmission bit rate and the second bit rate comprises resampling or discarding data packets. In an embodiment, the adjusting at least one of the transmission bit rate and the second bit rate comprises determining a difference between the measured indication of the duration of time and a threshold duration of time and generating a compensation signal based on the determined difference. In an embodiment, the generating the audio data signal comprises encoding the acquired audio data into the data packets and the generating the audio playback signal comprises decoding received data packets. In an embodiment, the receiving device is one of a plurality of receiving devices, and the method comprises: transmitting, by the transmitting device, data packets to the plurality of receiving devices during respective connection events, the connection events associated with a receiving device of the plurality of receiving devices being separated by the determined connection interval; measuring, by the transmitting device, respective phase delays associated with the plurality of receiving devices; transmitting, by the transmitting device and over a dedicated channel, an indication of the respective phase delay to the plurality of receiving devices; and aligning, by each of the plurality of receiving device, a phase of the audio playback signal of the respective receiving device based on the indication of the respective phase delay.

In an embodiment, a device comprises: a transceiver, which, in operation, exchanges data packets over a wireless communication link with a remote device during connection events separated by a determined connection interval; and data processing circuitry, which, in operation, measures an indication of a duration of time between at least two consecutive connection events associated with the remote device; and adjusts a bit rate based on the measured indication of the duration of time and the determined connection interval. In an embodiment, the exchanging data packets comprises audio data streaming according to a Bluetooth Low Energy (BLE) communications protocol. In an embodiment, the device comprises: a system clock wherein the adjusting the bit rate comprises adjusting a clock rate of the system clock. In an embodiment, the device comprises: a system clock; and a data acquisition clock, wherein the adjusting a bit rate comprises adjusting a clock rate of the data acquisition clock. In an embodiment, wherein the measuring the indication of the duration of time is performed using the data acquisition clock. In an embodiment, the device comprises: a system clock; and a decoder clock, wherein the adjusting the bit rate comprises adjusting a clock rate of the decoder clock. In an embodiment, the measuring the indication of the duration of time is performed using the decoder clock. In an embodiment, the adjusting the bit rate comprises resampling or discarding data packets. In an embodiment, the adjusting the bit rate comprises determining a difference between the measured indication of the duration of time and a threshold duration of time and generating a compensation signal based on the determined difference. In an embodiment, the device comprises at least one of: an encoder, which, in operation, encodes audio data into data packets; and a decoder, which, in operation, decodes data packets into audio data. In an embodiment, the transceiver, in operation, transmits data packets to a plurality of remote devices during respective connection events, the connection events associated with a remote device of the plurality of remote devices being separated by the determined connection interval; the data processing circuitry, in operation, measures respective phase delays associated with the connection events of the plurality of receiving devices; and the transceiver, in operation, transmits an indication of the respective phase delay to each of the plurality of remote devices. In an embodiment, the transceiver, in operation, receives an indication of a phase delay associated with a connection event; and the data processing circuitry, in operation, adjusts a playback phase associated with data packets received during the connection event based on the received indication of the phase delay associated with the connection event.

In an embodiment, a system comprises: a transceiver, which, in operation, exchanges data packets over a wireless communication link with a remote device during connection events separated by a determined connection interval; measurement circuitry, which, in operation, measures an indication of a duration of time between at least two consecutive connection events associated with the remote device; audio signal processing circuitry; and control circuitry, which, in operation adjusts a bit rate of the audio signal processing circuitry based on the measured indication of the duration of time and the determined connection interval. In an embodiment, the system comprises: an integrated circuit including the transceiver and at least one of the measurement circuitry, the audio signal processing circuitry and the control circuitry. In an embodiment, the system comprises: a system clock; and an audio signal processing clock, wherein control circuitry, in operation, adjusting the bit rate of the audio signal processing circuitry by adjusting a clock rate of the audio signal processing clock and the measurement circuitry, in operation, measures the indication of the duration of time based on a clock signal of the audio signal processing clock.

BRIEF DESCRIPTION OF THE SEVERAL VIEWS OF THE DRAWINGS

Embodiments of the present disclosure will now be described with reference to the annexed drawings, which are provided purely by way of non-limiting example and in which:

FIG. 3 shows a first embodiment of a clock skew compensation method;

FIG. 5 shows a third embodiment of a clock skew compensation method;

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Bluetooth Low Energy (BLE) is an emergent technology aiming to minimize the power consumption in low data rate wireless communications.

Figure 1:
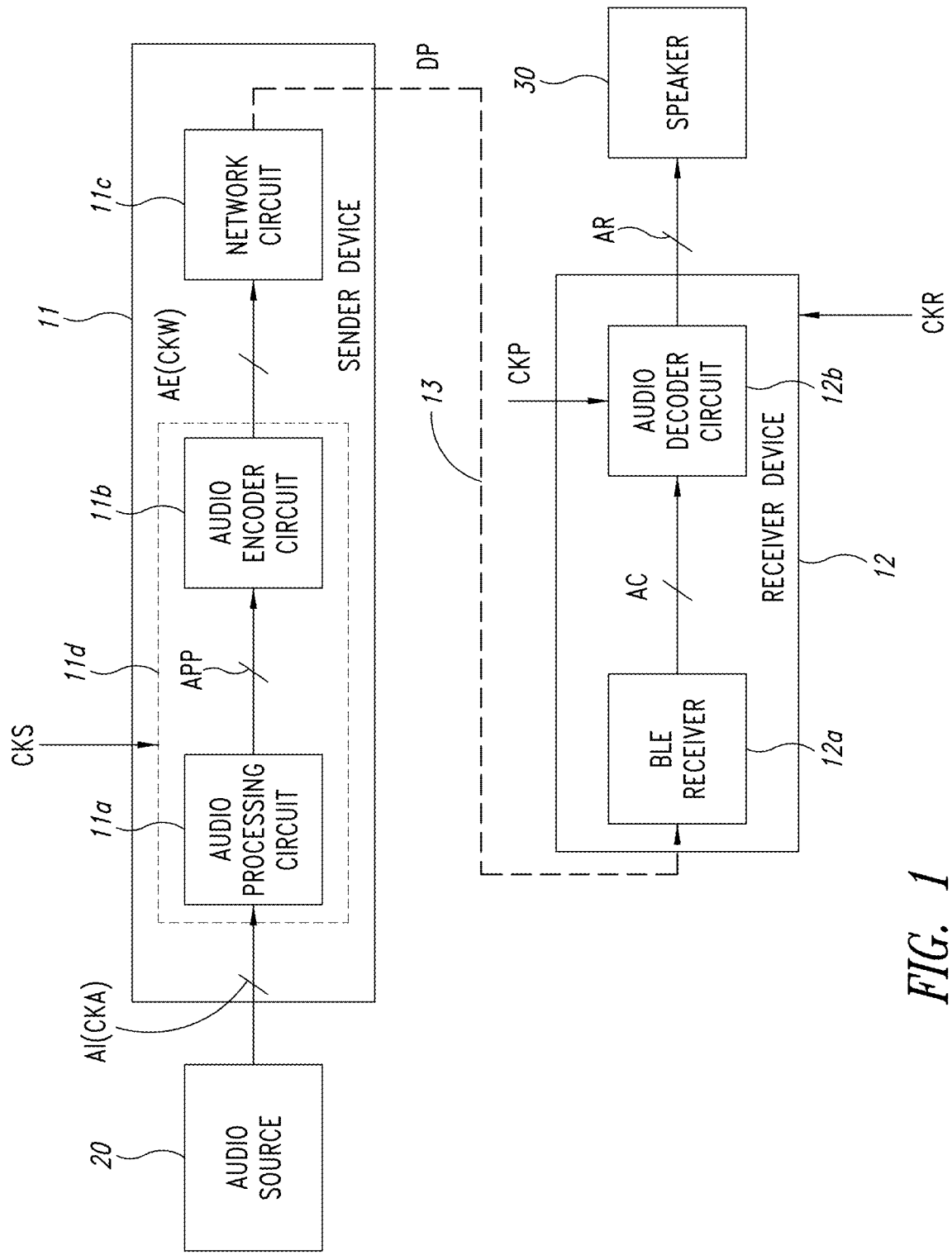
FIG. 1 shows an embodiment of a Bluetooth Low Energy (BLE) system architecture.

In FIG. 1 it is shown a block schematics of a BLE architecture where an audio source 20, which can be embodied for instance by a microphone or by a plurality of microphones, or it could be as well an audio signal stored at sender side on some kind of memory device (flash memory, USB stick and others), sends an audio input signal AI, for instance a 1 bit Pulse Density Modulation signal at 1 MHz, to a sender device 11, operating as the master or the server device, which includes an audio processing module or circuit 11a, acquiring, at an acquisition frequency CKA, for instance 16 KHz, and processing the audio input signal AI, for instance to perform audio enhancement operations or beam-forming operations and producing a pre-processed audio signal APP.

The audio processing module 11a may be a Pulse Density Modulation (PDM) filter converting the audio signal AI in a 16 bit Pulse Code Modulation (PCM) samples at 16 kHz, representing the pre-processed audio signal APP. Of course, the PCM audio could be at 8 or 24 bits samples, while the sampling could use different frequencies.

Such pre-processed audio signal APP is fed to an audio encoder module or circuit 11b outputting an encoded audio signal AE, for instance encoded according to ADPCM (Adaptive Differential Pulse Code Modulation)), SBC (Low Complexity Sub-band Coding), Opus or other suitable audio encoding protocol. The encoding and compression to obtain the encoded audio signal AE is used in order to respect the available bandwidth limits of the BLE link. Of course, in some cases it could not be necessary to perform an audio encoding step. In the illustrated example pre-processed audio signal APP is compressed in 4 bit ADPCM samples, at a frequency of 16 ksamples/s, which corresponds to a sender supply bitrate CKW. The modules 11a, 11b together substantially represent a sender system 11d, which can be considered also a host device. The encoded audio signal AE is then sent as audio data packets DP by a BLE network module or circuit 11c, which is substantially a transceiver operating according to the BLE protocol, substantially corresponding to a wireless host controller, over a BLE wireless link 13 to a receiver device 12, acting as the slave or the client. Of course, the same approach can be applied in the other direction from the receiver to the sender. The BLE network module 11c receives the samples in signal APP at 64 kbps supply bitrate CKW and transmits data packet DP at a bit-rate of 64.3 Kbps, since it includes a further 300 bps of sync information. Thus, the BLE network module 11c is supplied with the encoded audio signal at a first supply bitrate CKW, which is the frequency with which, preferably, the samples are taken by a transmission buffer in the sender system 11d, upstream the BLE network module 11c in the signal chain and them sent with such bitrate CKW over the link 13.

Such receiver 12 operates with a respective receiver system clock CKR and includes a BLE receiver circuit 12a to receive the data packets DP and output a compressed audio signal AC to an audio decoder circuit 12b which performs the decoding of the compressed audio signal AC, if necessary, and supplies, at a second supply frequency CKP, a reconstructed audio signal AR, e.g., the decoded data, for instance to a play back device such as a speaker circuit 30.

Figure 2:
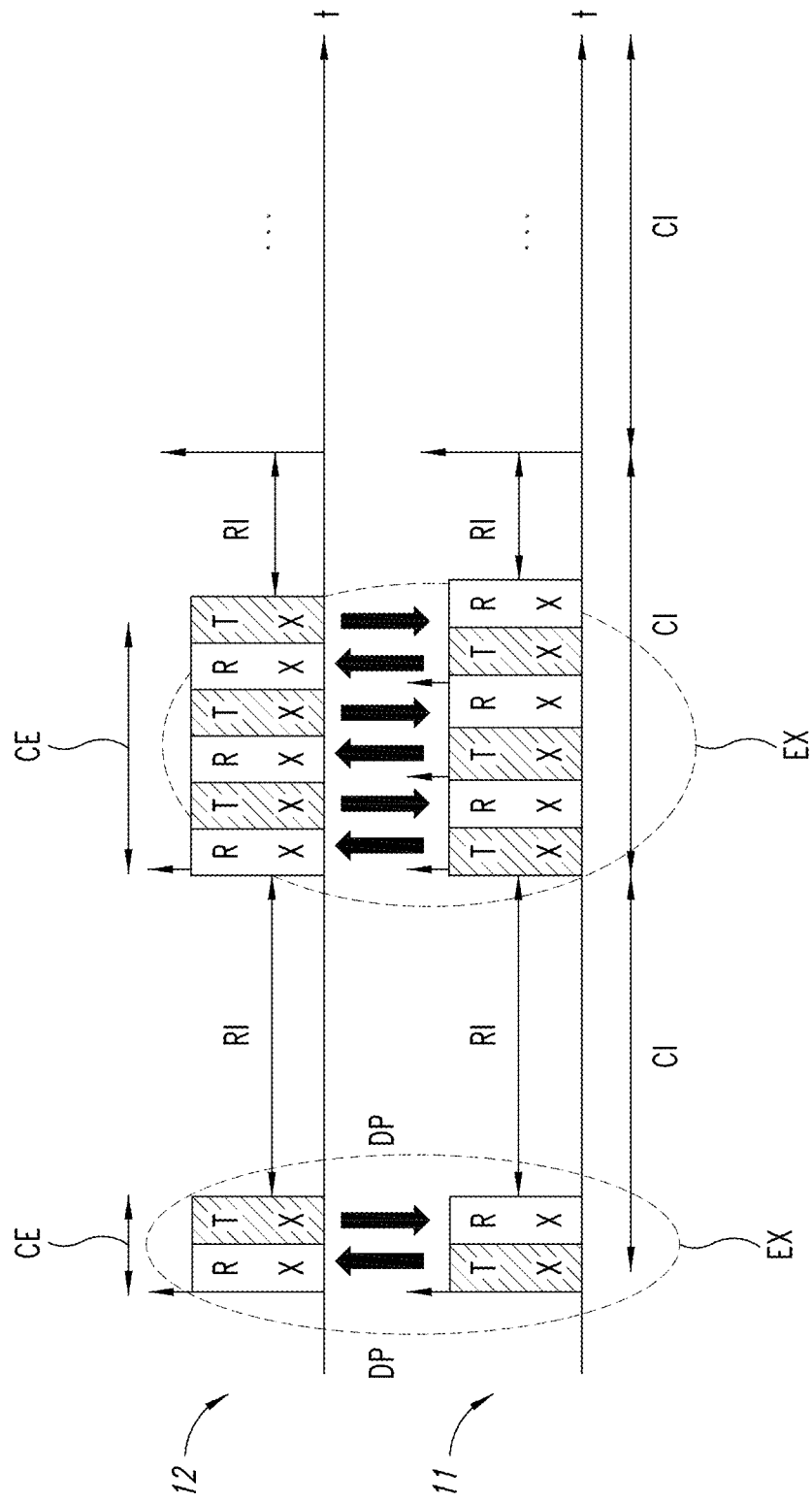
FIG. 2 shows a timing diagram of example packet exchanges of an embodiment.

With reference to FIG. 2, in the BLE standard is used the concept of connection event CE and connection interval CI. This is applied in a connection mode, once a connection between the BLE modules has been established.

A connection event CE is a sequence of data exchanges, in particular data packets DP, between the slave 12 and the master 11 at defined times before going back to a radio idle state RI to save power.

As shown in FIG. 2, where on a time diagram as a function of time t are shown the packet exchanged on the sender device 11, representing a local or master node, and the receiver 12, representing a remote or slave node, in black color are shown transmitted data packets DP and in white color are shown the receive data packets DP, at each node. The data packet DP can contain audio data. Of course, the BLE standard can send also other types of data packets, different from audio data packets. With EX is indicated an exchange where a data packet DP is transmitted from the master node 11 and received at slave node 12 or transmitted from the slave node 12 and received at master node 11. Each set of consecutives data exchanges EX, as mentioned is called a connection event CE, with a given time length.

While in an active connection, the specification of the BLE standard defines a connection interval CI between two consecutive connection events CE, which includes a set of consecutive data exchanges EX followed by a radio idle state RI, which serves to save power. For instance such connection interval CI can be set to a value between 7.5 ms and 4 s. Thus, the data in a BLE link are exchanged between two nodes only in correspondence of a connection event CE. The length of the connection event CE depends on the amount of data that must be sent. However, an exchange of empty packets is ensured even if there are no user data to be sent. Therefore the connection interval CI is the time interval occurring between connection events CE, irrespective of the presence of user data in the connection events CE.

Therefore the data packets DP are exchanged over the wireless link 13 in packet groups corresponding to a connection event CE separated by a determined connection interval CI.

When the master node 11 is connected to a slave node 12, connection events CE are continuously exchanged on the BLE Link Layer at each connection interval CI.

Considering two nodes connected with a connection interval CI of 10 ms, even if no audio data are being sent over the BLE link 13 for some reason, for instance the audio recording is not started yet, the connection event CE packets are sent by BLE Link Layer every 10 ms.

Being a wireless communication application, audio streaming over transmission according to the BLE standard is also affected by clock skew phenomena. As mentioned, as per the Bluetooth specification, BLE communication is based on a connection interval CI, which is the difference between two consecutive connection events. Data are exchanged only at a connection event CE. Considering the scenario of FIG. 1, where a master node 11 sends compressed audio data to a slave node 12 over a BLE link, depending on the audio sampling frequency and on the compression algorithm, a known number of compressed audio frames could theoretically be sent from the master node in a connection interval CI.

The architecture just described corresponds in general to having a sender device 11 and at least one remote receiver device 12, since the sender device can be a microphone, or a smart-phone, or other terminal, while the receiver device can be a plurality of devices, for instance one could have a left and a right speaker 30, where the audio data streaming, in particular according to BLE protocol, comprises exchanging the data packets DP between the sender device 11 and the remote receiver device 12 operating, the data packets DP being exchanged over the wireless link 13 in packet groups, the connection events CE, separated by a determined connection interval CI, the sender device 11 and the remote receiver device 12 being clocked by a respective system clock CKS, CKR. It is then provided acquiring, for instance at module 11a, at the sender device 12, the audio data AI from the microphone 20 at the acquisition frequency CKA, encoding, for instance in the module 11b the audio data AI, transferring the obtained encoded data AE at the first supply frequency CKW to the transceiver module represented by the BLE network module 11c in the sender device 11 and transmitting the encoded data AE in the data packets DP over the wireless link 13, and it is also provided receiving in the transceiver module represented by the BLE network module 12a the encoded data AE in data packets DP at the remote receiver device 12, decoding, in particular in module 12b the thus received encoded data AC into received audio data AR, supplying the received audio data AR to a playback device 30 at a second supply frequency CKP.

In ideal conditions, where the system clock CKS of the sender, master, node and the clock CKR of the receiver, slave, node are synchronized, the clock skew is zero, at any connection event CE a given number of packets is encoded and transferred with the supply frequency CKW, transmitted by the master node 11 and decoded and consumed at the slave node 12. In a real situation, clock skew affects the streaming of data, causing the receiver slave node 12 to handle a buffer overrun or under-run situation, as described above. This may lead to artifacts in the reproduced audio.

In order to address this situation, the simpler approach is to increase the dimension of the receiving audio buffer in the receiver node a bigger buffer means a less frequent overrun or under-run situation, but also an increased overall audio latency, which may not be well tolerated in particular use cases, such as full duplex speech communications.

In the following FIGS. 3 to 7 parts, elements or components which have already been described with reference to FIGS. 1 and 2 are denoted by the same references previously used in such Figures, unless the context indicates otherwise. The description of such previously described elements will not be repeated in the following in order not to overburden the present detailed description.

As mentioned in the foregoing, the present disclosure relates to clock skew compensation method. An embodiment exploits the observation that the connection interval represents a common shared clock between the local sender node, or device, and the remote receiver node, and consequently exploits the connection events packets, regularly exchanged by the two nodes involved for instance in a BLE connection, to extract a common frequency signal and using it to tune the clock of the two nodes, so as to reduce the clock skew and therefore facilitating a reduction in latency of audio transmission over the audio streaming, in particular according to the BLE protocol.

In an embodiment, two wireless devices, one representing the local node, e.g., master or server or sender node, and one representing the remote node, e.g., slave or client or receiver node, share a virtual clock signal and facilitates running at a synchronized frequency with reduced clock skew (e.g., equal to zero).

With reference to FIG. 3, considering a generic BLE node device or circuit 11 composed of an audio acquisition module or circuit 11d, which can include the modules or circuits 11a-11b of FIG. 1 and a BLE transmission module or circuit 11c performing as host controller, three different approaches are proposed in the following. For all the three approaches as illustrated:

with CKS is indicated a system clock frequency of the sender system 11d, e.g., a frequency of the system;

with CKA is indicated the clock frequency of the audio acquisition by the corresponding audio acquisition subsystem, which is for instance embodied by the module 11a of FIG. 1;

with CKE is indicated a clock frequency extracted from the connection events CE packets, specifically from the connection intervals CI. This is the common clock shared by the two devices involved in a BLE connection.

In FIG. 3 it is shown a sender node 11 implementing a first embodiment of the clock skew compensation method here described, in which the connection interval CI is used to trim the audio acquisition frequency CKA.

As shown in FIG. 3, from the BLE network module or circuit 11c is supplied the extracted clock frequency CKE, extracted by the connection interval CI of the data packets DP received at the BLE network module 11c, e.g., the difference in time between two consecutive connection event CE packets. Such extracted clock frequency is fed to a control module or circuit 50, which outputs the audio acquisition frequency CKA synchronized with the extracted clock frequency CKE. This audio acquisition frequency CKA clocks the operation of the acquisition process so as to generate a number of acquired frames equal to what the receiver node 12 will expect in a given time frame. Then, the local host 11d, although module or circuit 11b is not shown in FIG. 3, as described with reference to FIG. 1 outputs at an encoded audio signal AE, which frequency, or better bit-rate, corresponds to the supply frequency CKW. In this case the host clock CKS, which is the clock of the whole local host 11d, is not tuned. In an embodiment, the system frequency CKS is independent of said correction clock signal, e.g., the extracted clock CKE. This approach applies when the audio subsystem 11a can be easily tuned to work with a specified clock, e.g., extracted clock CKE.

Figure 4:
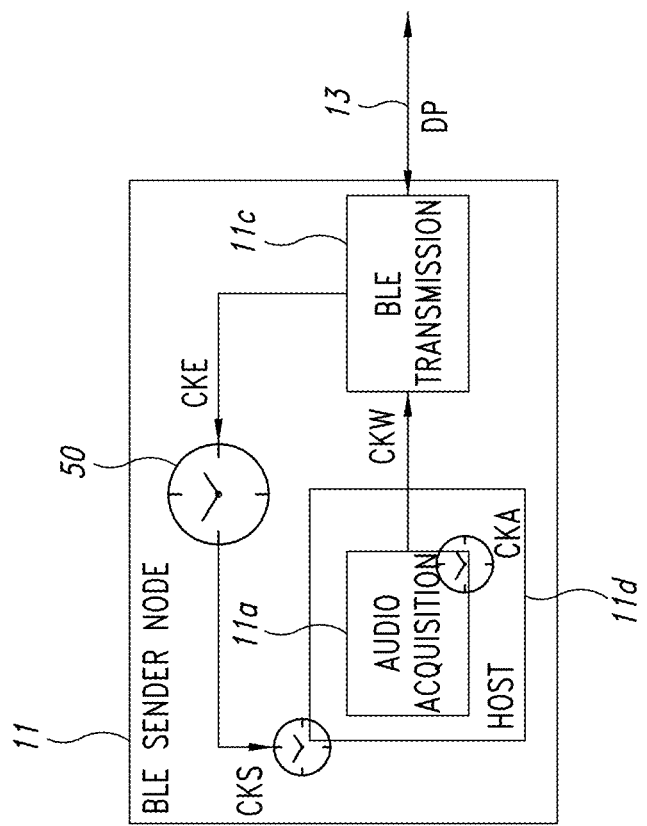
FIG. 4 shows a second embodiment of clock skew compensation method.

In FIG. 4, it is shown a different embodiment, in which the connection interval CI is used to trim the system, e.g., local host 11d, frequency CKS and only as a consequence the audio acquisition frequency CKA, which is derived by the system clock CKS.

In this approach, as shown in the figure, the extracted clock frequency CKE, extracted by the connection interval CI signal received through the BLE module 11c is used to feed the control module 50, which outputs the system clock CKS synchronized with the extracted clock frequency CKE. The system clock frequency CKS, which is the clock frequency of the local host 11d, is consequently used to tune the audio acquisition sub-system 11a. Then, the local host 11d, although module 11b is not shown, as described with reference to FIG. 1 outputs at an encoded audio signal AE at a frequency which corresponds to the supply frequency CKW. This approach may be advantageously used when the audio subsystem 11a derives its audio acquisition frequency CKA from the system clock CKS.

In FIG. 5 it is shown a third embodiment in which the connection interval CI is used to trigger audio re-sampling and compression.

In this approach, as shown in the figure, the extracted clock frequency CKE extracted by the connection interval signal CI is used to trigger a module or circuit to perform an audio re-sampling. The local host 11d, although module 11b is not shown, as described with reference to FIG. 1 outputs at an encoded audio signal AE at a supply frequency CKW.

A re-sampling module or circuit 11e is provided receiving the coded data AE at a sampling frequency CKW'. Instead of tuning audio acquisition, the extracted clock frequency CKE, through the control module 50, synchronizes a re-sampling frequency, corresponding to the first supply frequency CKW, e.g., the frequency at which the coded audio signal AE packets are supplied to the BLE 11c, of a re-sampling step performed in the re-sampling module or circuit 11e, with the result of having a fixed amount of data ready to be transmitted, at the supply frequency CKW, over the BLE link 13. Audio acquisition clock CKA and system clock CKS in this case are not tuned by the extracted clock CKE and therefore may produce less or more data than expected in a time frame. This effect is compensated by the re-sampling operation at module 11e. This approach may be used when it is not possible or desirable to tune the audio subsystem or the system clock to control audio data generation. Setting the system frequency CKS independent of said correction clock signal, e.g., the extracted clock CKE can be in this case implemented as a complementary measure.

With reference to the embodiment of FIG. 5, as previously described, packets generated by the acquisition are stored in a buffer ready to be transmitted. Considering that a number N of packets should be sent on the link in any period corresponding to the nominal reference connection interval $tCI_{ref}$ to have a constant bandwidth, at each time instant corresponding to the beginning of the connection interval CI, the resampling block 11e reads from such buffer a number M of available samples and applies a digital processing algorithm so as to adjust the number M of available samples to be equal to the number N of packets that should be sent on the link 13. In example described, this is implemented duplicating acquired samples to reach the target number N when M<N, or deleting samples when M>N. In order to achieve better results in terms of audio quality other algorithms can be applied for re-sampling, e.g., interpolation—the key point being that the triggering signal for the conversion is each time instant corresponding to the beginning of the connection interval CI, this resulting in a transmission clocked by the connection interval CI signal. It is noted that that the same approach can be applied at receiver 12 side with audio playback, placing the re-sampling module or circuit for instance downstream before the playback module or speaker 30: at the beginning of each connection interval CI, the re-sampling algorithm adjusts the number of samples for reproduction.

Figure 6:
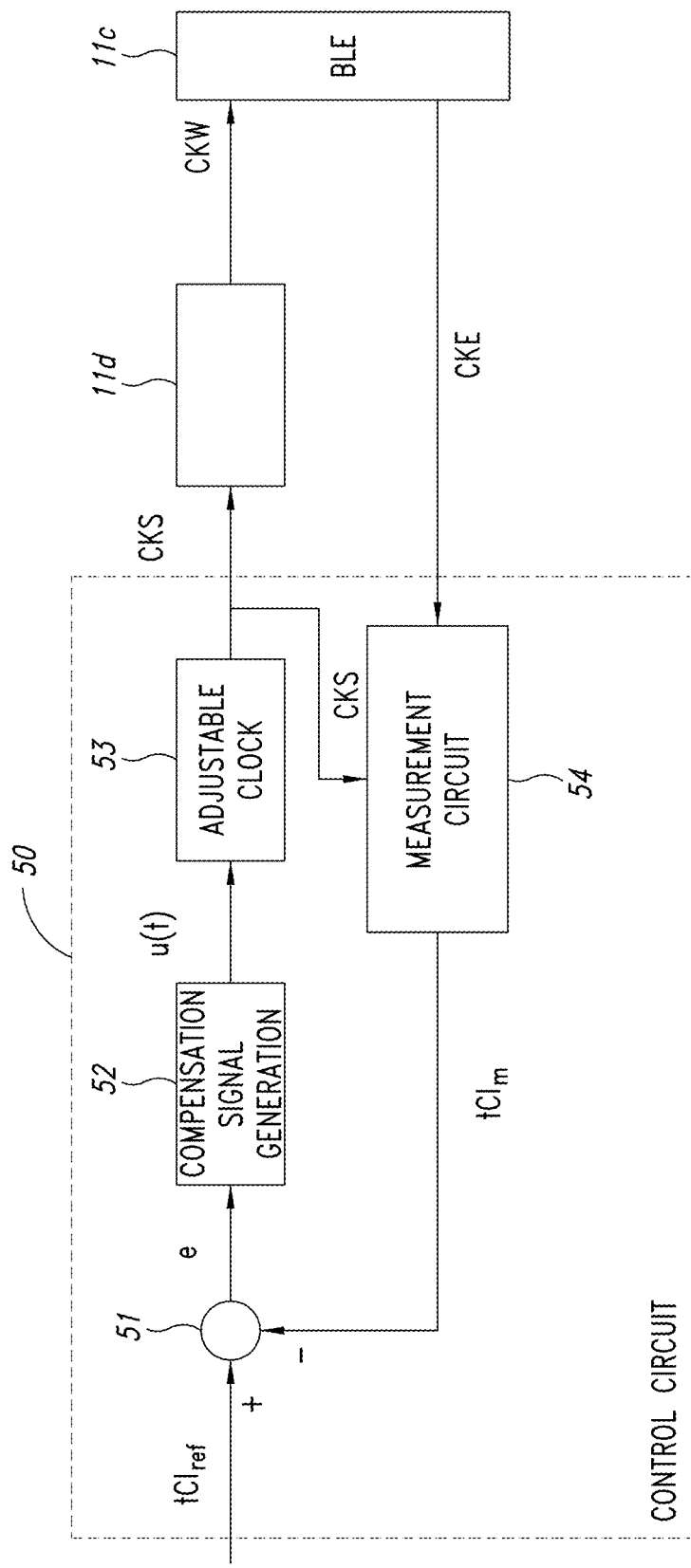
FIG. 6 shows an embodiment of a circuit to implement a clock skew compensation method.

In FIG. 6 it is shown schematically the control module or circuit 50, in particular with reference to the case of FIG. 4, in which the system clock frequency CKS is controlled by the extracted clock frequency CKE. Such control module 50 is implemented in the form of a closed loop control, which comprises a comparison node 51, e.g., a summing block, receiving at its inputs a connection interval reference value $tCI_{ref}$, e.g., a threshold time duration value which, in the example here described, may be a constant having a value of 10 ms, and a connection interval measured value $tCI_m(t)$, e.g., a time duration value which varies in time, and determining the difference between these two quantities, thus outputting a connection interval error $e(t)=tCI_{ref}-tCI_m(t)$, which also varies in time. A block or circuit 52 implements a control algorithm, for instance a PID (Proportional Integral Derivative) control algorithm, outputting a corresponding control action u(t), applied to a trimmable or adjustable clock 53. The trimmable, e.g., with controllable frequency, clock 53 issues a clock signal used as reference for the system, in the example the system clock signal having the frequency CKS. Such system clock signal can be also the signal used by a part of the system, such as an audio sub-clock, e.g., the clock frequency of the audio acquisition CKA, or the first supply clock CKW fed to the re-sampling block 11e. In the same way, at the receiver 12 it can be the second supply signal CKP or the receiver system clock CKR. The clock signal frequency CKS can be trimmed adjusting its frequency at run time. Such trimmable clock 53 could be implemented as an external trimmable quartz, or a trimmable internal oscillator, or a trimmable PLL, etc.

The synchronized system clock signal frequency CKS is supplied to the system to be synchronized, in the example to the local host 11d. As mentioned, in the embodiment of FIG. 3 the synchronized signal is the audio acquisition signal CKA, while in the embodiment of FIG. 5 is the resampling frequency CKW, corresponding to the supply frequency of the encoded signal AE to the BLE module 11c.

In FIG. 6 it is shown that the system clock signal frequency CKS is also supplied on a feedback branch of the closed loop to a measurement module or circuit 54.

This applies to the case of FIG. 4, while for the case of FIG. 3 or 5 the acquisition frequency CKA or the supply bit-rate CKW are respectively supplied as system clock to the measurement module or circuit 54. This because the measurement module 54 obtains the clock signal from the system under control (which in the case of the embodiments of FIGS. 3 and 5 controls the acquisition frequency CKA and the supply bit-rate CKW respectively), so that the measured value is influenced by the tuning and can converge to the nominal value.

The measurement module 54 receives also the extracted clock frequency CKE, from the BLE module 11c, which is represented by clock transitions corresponding to a connection interval CI. The measurement module 54 measures such connection interval CI in the extracted clock frequency CKE, which is the connection interval CI in the signal received over the BLE link 13, using the system clock frequency CKS. The measurement module or circuit 54 can be embodied by a hardware timer. The measurement module 54 outputs the connection interval measured value $tCI_m$, which is then supplied to the comparison node 51 to compute the connection interval error e(t). This correspond to the connection interval measured at the local host side. The connection interval measured value $tCI_m$ can be measured on a single connection interval CI received on the link 13 or can be averaged over a plurality of consecutive measurements of the connection interval CI received on the link 13.

In an embodiment, the control module or circuit 50 facilitates minimizing the difference between the reference clock value and the measured value that is: $\min(e(t))=\min(tCI_{ref}(t)-tCI_m(t))$.

Therefore, in general, in view of what have been described so far, the operation of the control module of an embodiment can be defined as follows.

The BLE protocol defines a master node (called Central), e.g., node 11, and one or more slave nodes (called Peripheral) 12. During the handshake phase to set the communication between the master node 11 and the slave nodes 12, the master node 11 decides the value of the reference connection interval $tCI_{ref}$ and communicates it to the slave nodes 12. The slave nodes 12 store the reference connection interval $tCI_{ref}$ for instance in a respective register, which is used when the connection between the master node 11 and the slave nodes 12 is established, to be supplied as set-point to the control module 50.

Figure 7:
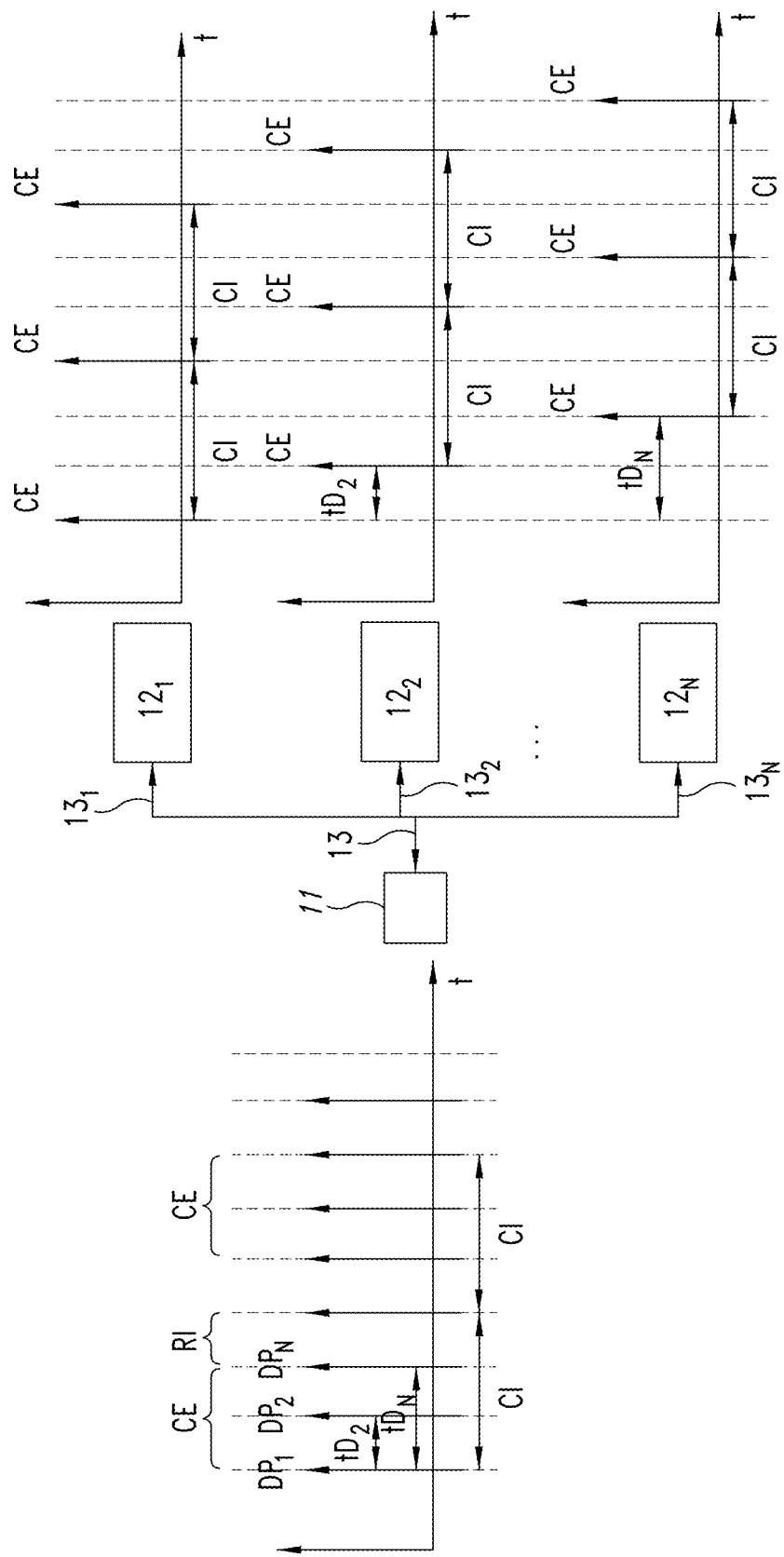
FIG. 7 shows an embodiment of a multi-node implementation of an embodiment of a clock skew compensation method.

In FIG. 7 it shown a multi-slave network having a master sender node 11 and a plurality of slave receiver nodes $12_1$, $12_1 \ldots 12_N$, where N is the number of receiver nodes. The multi-slave network is affected by clock skew phenomena for all the point-to-point links, i.e., all the links $13_1$, $13_1 \ldots 13_N$ between the local node 11 and each slave node $12_1, 12_1 \ldots 12_N$ composing the network.

The clock skew compensation method using the connection interval CI here described can be applied for each link $13_1, 13_1 \ldots 13_N$, which is treated as a separate point to point link.

Further, in a multi-slave network, each master or slave device has a clock phase, too.

The method of an embodiment compensates the phase of the clocks of all the slave nodes of the network.

As described in FIG. 7, where a time diagram of the packets exchanged at each node is shown near the relevant node, the local sender device 11 exchanges within a connection interval CI packets $DP_1$ with the first remote device $12_1$, and, in the case all the slave nodes $12_i$, i being a slave node index from 1 to N, have a different phase, exchanges within the same connection interval CI second packets $DP_2$ with the second remote device $12_2$ at a time delayed of a time delay $tD_2$ and, going on, an N-th packet $DP_N$ at time delayed $tD_N$ with the N-th remote device $12_N$. It is noted that in an embodiment the slave nodes $12_i$, since the multiple connections with the local sender device 11 operating as master node are performed in different time slots, transmit with a different phase.

As shown in the diagrams adjacent to each remote device, each remote receiver device $12_i$ exchanges in its turn respectively data packets $12_1, 12_2, 12_N$ with the local sender device 11, with a respective delay $tD_2 \ldots tD_N$.

Therefore, the method here described further provides given the packets $DP_1 \ldots DP_N$ received at the local device within a same connection interval CI from different remote devices, measuring the phase delay $tD_i$ of the packet of each remote device with respect to the other, communicating from the local device 11 on a dedicated channel to all the remote devices $12_1 \ldots 12_K$ the respective phase delay $tD_2 \ldots tD_N$, performing alignment of the phase at each remote node $12_i$ on the basis of the phase delay communicated.

The embodiments disclosed herein may have significant advantages with respect to the known solutions.

In an embodiment, by using the clock shared by the BLE modules, the clock skew affecting the streaming of data is avoided, causing the receiver slave node to handle a buffer overrun or under-run situation, as described above. Such clock skew may lead to artifacts in the reproduced audio and to greater latency for the compensation.

Of course, without prejudice to the principle of the disclosure, the details of construction and the embodiments may vary widely with respect to what has been described and illustrated herein purely by way of example, without thereby departing from the scope of the present disclosure, as defined by the ensuing claims.

Embodiments described can be applied as mentioned in audio communication over BLE, but application can be extended to audio data streaming in wearable devices, Internet of Things and other remote controllers, as well as in other application in the fields of Audio Entertainment & Gaming, Wearable, Smart Home, Voice controlled TV remote.

It must be underlined that although the embodiments are mainly described with reference to a sender device or node which operates as a master and transmits to one or more receiver devices or nodes, which operates as slaves, of course the method here described applies also to data, which can be audio or other data, transmitted on the BLE link in the other direction by the remote receivers, in particular slave nodes, e.g., the method here described can be applied bi-directionally.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    acquiring, by a transmitting device, audio data from an audio data source at an acquisition frequency;
    generating, by the transmitting device and at a first bit rate, an audio data signal from the acquired audio data;
    transmitting, over a wireless communication link and by the transmitting device, data packets including the audio data signal in packet groups during connection events separated by a determined connection interval;
    receiving, via the wireless communication link and by a receiving device, the transmitted packet groups;
    generating, by the receiving device and at a second bit rate, an audio playback signal based on the received packet groups;
    measuring, by at least one of the transmitting device and the receiving device, an indication of a duration of time between at least two consecutive connection events; and
    adjusting at least one of a transmission bit rate and the second bit rate based on the measured indication of the duration of time.

2. The method of claim 1 wherein the transmitting comprises audio data streaming according to a Bluetooth Low Energy (BLE) communications protocol.

3. The method of claim 1 wherein the transmitting device is clocked by a first clock and the receiving device is clocked by a second clock.

4. The method of claim 3 wherein the adjusting at least one of the transmission bit rate and the second bit rate comprises adjusting a clock rate of at least one of the first clock and the second clock.

5. The method of claim 3 wherein the transmitting device includes an acquisition clock and the adjusting at least one of the transmission bit rate and the second bit rate comprises adjusting a clock rate of the acquisition clock.

6. The method of claim 5 wherein the measuring the indication of the duration of time is performed by the transmitting device using the acquisition clock.

7. The method of claim 3 wherein the receiving device includes a playback clock and the adjusting at least one of the transmission bit rate and the second bit rate comprises adjusting a clock rate of the playback clock.

8. The method of claim 7 wherein the measuring the indication of the duration of time is performed by the receiving device using the playback clock.

9. The method of claim 1 wherein the adjusting at least one of the transmission bit rate and the second bit rate comprises resampling or discarding data packets.

10. The method of claim 1 wherein the adjusting at least one of the transmission bit rate and the second bit rate comprises determining a difference between the measured indication of the duration of time and a threshold duration of time and generating a compensation signal based on the determined difference.

11. The method of claim 1 wherein the generating the audio data signal comprises encoding the acquired audio data into the data packets and the generating the audio playback signal comprises decoding received data packets.

12. The method of claim 1 wherein the receiving device is one of a plurality of receiving devices, and the method comprises:
    transmitting, by the transmitting device, data packets to the plurality of receiving devices during respective connection events, the connection events associated with a receiving device of the plurality of receiving devices being separated by the determined connection interval;
    measuring, by the transmitting device, respective phase delays associated with the plurality of receiving devices;

transmitting, by the transmitting device and over a dedicated channel, an indication of the respective phase delay to the plurality of receiving devices; and aligning, by each of the plurality of receiving device, a phase of the audio playback signal of the respective receiving device based on the indication of the respective phase delay.

13. A device, comprising:
a transceiver, which, in operation, exchanges data packets over a wireless communication link with a remote device during connection events separated by a determined connection interval; and
data processing circuitry, which, in operation,
measures an indication of a duration of time between at least two consecutive connection events associated with the remote device; and
adjusts a bit rate based on the measured indication of the duration of time and the determined connection interval.

14. The device of claim 13 wherein the exchanging data packets comprises audio data streaming according to a Bluetooth Low Energy (BLE) communications protocol.

15. The device of claim 13, comprising:
a system clock wherein the adjusting the bit rate comprises adjusting a clock rate of the system clock.

16. The device of claim 13, comprising:
a system clock; and
a data acquisition clock, wherein the adjusting a bit rate comprises adjusting a clock rate of the data acquisition clock.

17. The device of claim 16 wherein the measuring the indication of the duration of time is performed using the data acquisition clock.

18. The device of claim 13, comprising:
a system clock; and
a decoder clock, wherein the adjusting the bit rate comprises adjusting a clock rate of the decoder clock.

19. The device of claim 18 wherein the measuring the indication of the duration of time is performed using the decoder clock.

20. The device of claim 13 wherein the adjusting the bit rate comprises resampling or discarding data packets.

21. The device of claim 13 wherein the adjusting the bit rate comprises determining a difference between the measured indication of the duration of time and a threshold duration of time and generating a compensation signal based on the determined difference.

22. The device of claim 13, comprising at least one of:
an encoder, which, in operation, encodes audio data into data packets; and a decoder, which, in operation, decodes data packets into audio data.

23. The device of claim 13 wherein,
the transceiver, in operation, transmits data packets to a plurality of remote devices during respective connection events, the connection events associated with a remote device of the plurality of remote devices being separated by the determined connection interval;
the data processing circuitry, in operation, measures respective phase delays associated with the connection events of the plurality of receiving devices; and
the transceiver, in operation, transmits an indication of the respective phase delay to each of the plurality of remote devices.

24. The device of claim 13 wherein,
the transceiver, in operation, receives an indication of a phase delay associated with a connection event; and
the data processing circuitry, in operation, adjusts a playback phase associated with data packets received during the connection event based on the received indication of the phase delay associated with the connection event.

25. A system, comprising:
a transceiver, which, in operation, exchanges data packets over a wireless communication link with a remote device during connection events separated by a determined connection interval;
measurement circuitry, which, in operation, measures an indication of a duration of time between at least two consecutive connection events associated with the remote device;
audio signal processing circuitry; and
control circuitry, which, in operation adjusts a bit rate of the audio signal processing circuitry based on the measured indication of the duration of time and the determined connection interval.

26. The system of claim 25, comprising:
an integrated circuit including the transceiver and at least one of the measurement circuitry, the audio signal processing circuitry and the control circuitry.

27. The system of claim 25, comprising:
a system clock; and
an audio signal processing clock, wherein control circuitry, in operation, adjusting the bit rate of the audio signal processing circuitry by adjusting a clock rate of the audio signal processing clock and the measurement circuitry, in operation, measures the indication of the duration of time based on a clock signal of the audio signal processing clock.

* * * * *